United States Patent
Kim et al.

(10) Patent No.: US 8,385,276 B2
(45) Date of Patent: Feb. 26, 2013

(54) FREQUENCY TRACKING LOOP FOR WIRELESS COMMUNICATIONS

(75) Inventors: Byoung-Hoon Kim, Seoul (KR); Peter Gaal, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 749 days.

(21) Appl. No.: 12/500,517

(22) Filed: Jul. 9, 2009

(65) Prior Publication Data

US 2011/0007694 A1 Jan. 13, 2011

(51) Int. Cl.
*H04W 4/00* (2009.01)
(52) U.S. Cl. ...................................................... 370/329
(58) Field of Classification Search .................... 370/329
See application file for complete search history.

(56) References Cited

PUBLICATIONS

Viterbi, Andrew J., "CDMA: Principles of Spread Spectrum Communication", Apr. 27, 1995, Chapter 3, Section 3.5, pp. 60-63, Addison-Wesley Pub. Co., Reading, MA.

Eltawil A M, et al., "Modified all digital timing tracking loop for wireless applications", New Frontiers in Telecommunications: 2003 IEEE International Conference on Communications; ICC 2003; May 11-15, 2003, Anchorage, Alaska, USA; [IEEE International Conference on Communications], IEEE Operations Center, Piscataway, NJ, vol. 5, May 11, 2003, pp. 3550-3554, XP010643105, DOI: DOI:10.1109/ICC.2003.1204114 ISBN: 978-0-7803-7802-5 figure 1.
International Search Report and Written Opinion -PCT/US2010/041590, International Search Authority—European Patent Office—Dec. 10, 2010.
Van Nee, R.; Prasad, R.: "OFDM for Wireless Multimedia Communications", Jan. 1, 2000, Artech House, Boston, XP002611771, ISBN: 0890065306 pp. 80-87, paragraph [04.5].

*Primary Examiner* — Anh-Vu Ly
*Assistant Examiner* — Gbemileke Onamuti
(74) *Attorney, Agent, or Firm* — Peter A. Clevenger

(57) ABSTRACT

Systems and methodologies are described that facilitate computing discriminator signals for frequency tracking in wireless communications. The discriminator signal can be computed based at least in part on representations of a received signal shifted upward by a portion of a frequency tone and downward by the portion of the frequency tone. The shifted signals can be summed, and a dot product of the summed signals and a channel estimation of the original signal can be computed to remove uncertain frequency response due to fading. The discriminator signal can be computed as the imaginary portion of the dot product. A frequency error offset can be determined from the discriminator signal and applied to a receiver to tune alignment of the receiver with frequencies of received signals.

29 Claims, 13 Drawing Sheets

FREQUENCY TRACKING LOOP FOR WIRELESS COMMUNICATIONS

BACKGROUND

I. Field

The present disclosure relates generally to wireless communications and more specifically to frequency tracking.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc., which can utilize evolved universal terrestrial radio access (E-UTRA) to facilitate radio communication between wireless devices. E-UTRA can also be utilized in evolved packet systems (EPS), such as 3GPP LTE.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Receivers utilized for wireless communications, however, can experience frequency error over time. This frequency error can cause reduced signal amplitude, phase offset, and inter-carrier interference (e.g., in an orthogonal frequency division multiplexing (OFDM) system), etc., since the full signal is not properly received. Previous solutions to this issue include pilot signal aided frequency estimation where adjacent time segments of OFDM waveforms, which include pilot signals, can be used for frequency estimations to align the receiver frequency. In addition, cyclic prefix (CP)-based frequency estimation can be utilized to account for the error where portions of transmissions are repeated within the transmission and the repeated portions can be used to estimate frequency error. Since CP repeats the transmission within the original transmission resources, the effective allowable time for transmissions decreases, which in turn decreases the system capacity.

In addition, timing tracking loops exist that correct timing of wireless devices for synchronization with disparate devices. Timing tracking loops typically determine a timing tracking discriminator signal by subtracting an early shift in time domain of a received pilot sequence from a late shift in time domain of the received pilot sequence. The discriminator signal can be utilized to estimate timing error in the device by multiplying a gain signal, summing a feedback signal, and detecting overflow/underflow in the resulting signal. Where values of the resulting signal are in a predetermined range, there is no need to correct the device for timing error. Where values of the resulting signals overflow the range, however, the device can advance timing related to the overflow amount. Similarly, where values of the resulting signals underflow the range, the device can reduce timing according to the underflow.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating frequency tracking in wireless communications by evaluating a frequency upward shift of a received signal as well as a frequency downward shift of the signal to generate a discrimination signal that can be utilized to determine a frequency error offset in the receiver. The receiver can be adjusted according to the offset to properly receive wireless communication signals. This can be performed in a loop, for example, so the receiver is constantly determining whether adjustment is necessary. In addition, the receiver can be adjusted in this regard using data symbols, pilot signals, primary synchronization signal (PSS)/secondary synchronization signal (SSS) bursts, and/or the like.

According to related aspects, a method for receiver frequency tracking in wireless communications is provided. The method can include generating a representation of a received signal shifted upward by a portion of a frequency tone and generating a disparate representation of the received signal shifted downward by the portion of the frequency tone. The method also includes performing a channel estimation over the received signal and computing a discriminator signal for determining a frequency error offset in the received signal based at least in part on a dot product of a summation of the representation and disparate representation of the received signal.

Another aspect relates to a wireless communications apparatus. The wireless communications apparatus can include at least one processor configured to create an up-shifted signal by shifting a received signal in frequency domain upward by a fraction of frequency tone offset and create a down-shifted signal by shifting the received signal in frequency domain downward by the fraction of frequency tone offset. The processor is further configured to determine a channel estimate from the received signal and computing a dot-product of the channel estimate and a summation of the up-shifted signal and the down-shifted signal to generate a discriminator signal for determining a frequency error offset of the received signal. The wireless communications apparatus also comprises a memory coupled to the at least one processor.

Yet another aspect relates to a wireless communications apparatus that facilitates establishing selected radio bearers in wireless communications. The wireless communications apparatus can comprise means for generating an up-shifted signal related to applying a negative fractional frequency tone offset to a received signal and means for generating a down-shifted signal related to applying a positive fractional frequency tone offset to the received signal. The wireless communications apparatus can additionally include means for performing a channel estimation over the received signal and means for computing a discriminator signal for determining a frequency error offset of the received signal based at least in part on a dot-product of the channel estimation and a summation of the up-shifted signal and the down-shifted signal.

Still another aspect relates to a computer program product, which can have a computer-readable medium including code for causing at least one computer to generate a representation of a received signal shifted upward by a portion of a frequency tone and code for causing the at least one computer to generate a disparate representation of the received signal shifted downward by the portion of the frequency tone. The computer-readable medium can also comprise code for causing the at least one computer to generate a channel estimation from the received signal and code for causing the at least one computer to compute a discriminator signal for determining a frequency error offset in the received signal based at least in part on a dot product of the channel estimation and a summation of the representation and disparate representation of the received signal.

Moreover, an additional aspect relates to an apparatus. The apparatus can include a frequency up-shift component that generates an up-shifted signal related to applying a negative fractional frequency tone offset to a received signal and a frequency down-shift component that creates a down-shifted signal related to applying a positive fractional frequency tone offset to the received signal. The apparatus can further include an on-frequency component that generates a channel estimation from the received signal and a discriminator component that formulates a discriminator signal for determining a frequency error offset of the received signal based at least in part on a dot product of the channel estimation and a summation of the up-shifted signal and the down-shifted signal.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
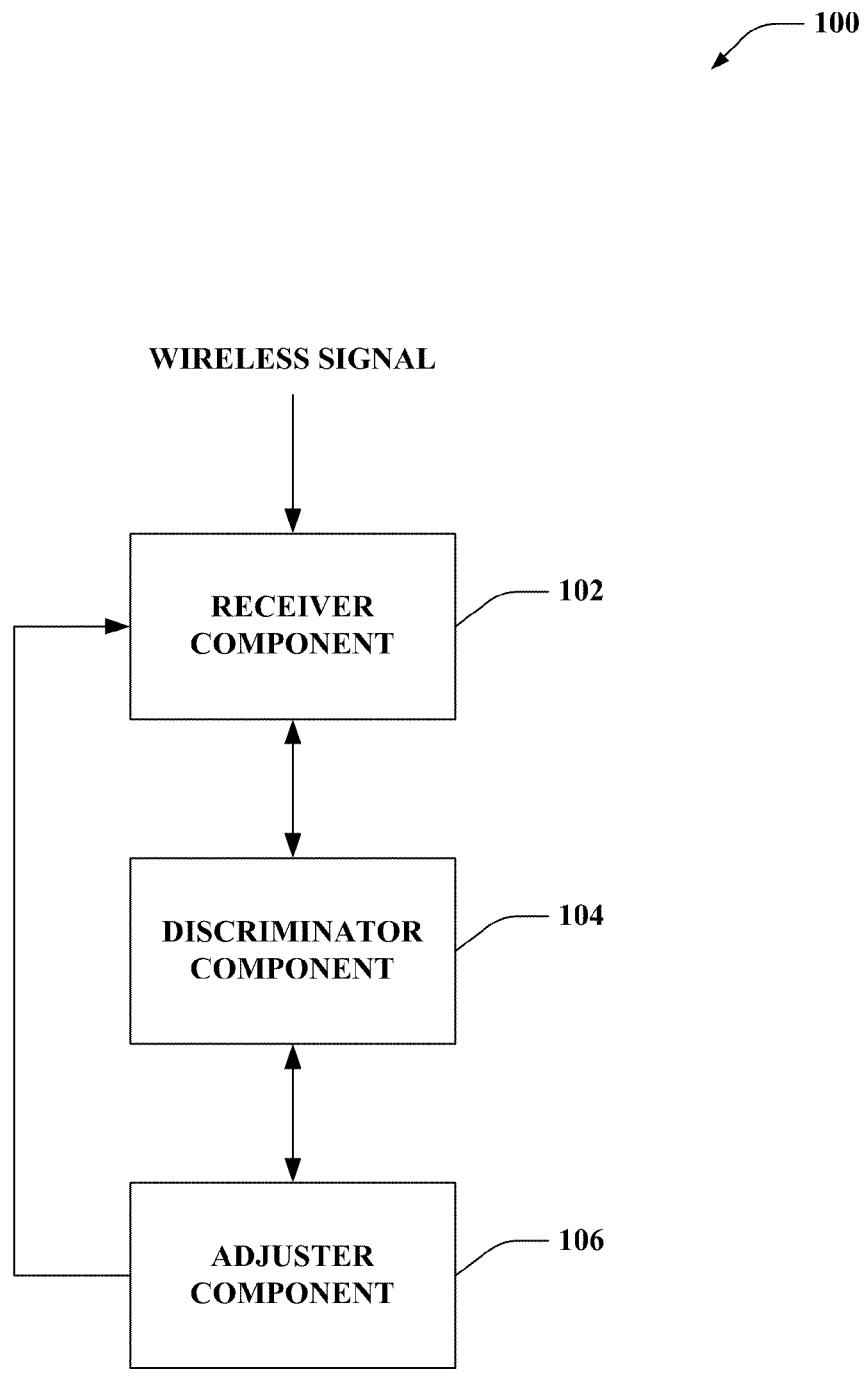
FIG. 1 is a block diagram of a system for adjusting a receiver according to computing a discriminator signal based on a received signal.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 that facilitates utilizing frequency tracking to adjust a wireless communications receiver. A receiver component 102 is provided that obtains one or more wireless communications signals. A discriminator component 104 is also shown that detects a frequency offset related to signals received by the receiver component 102. Moreover, an adjuster component 106 is depicted that can modify the receiver component 102 according to a frequency offset computed by the discriminator component 104. According to an example, the receiver component 102 can receive one or more signals from various devices. In one example, the signals can relate to pilot signals or reference signal, data symbols, primary synchronization signal (PSS)/secondary synchronization signal (SSS) bursts, and/or the like.

The discriminator component 104 can compute a discriminator signal used to estimate a frequency offset related to the receiver component 102 obtaining the signals. For example, the discriminator component 104 can evaluate the received signal shifted up in frequency as well as the received signal shifted down in frequency. Summing the signals with the shifted up and shifted down frequencies, for instance, can yield a discriminator signal, which the discriminator component 104 can evaluate to determine whether the receiver component 102 exhibits a positive or negative frequency error offset. The adjustor component 106 can apply the offset to the receiver component 102 to align the receiver component 102 for receiving subsequent signals. In one example, the discriminator component 104 can shift the received signal upward and/or downward by a fraction (e.g., three quarters, one half, one quarter, one third, etc.) of a unit of an OFDM tone/subcarrier.

Moreover, in an example, the wireless signal can be a signal transmitted in an OFDM system; in this regard, the signal can relate to data transmitted over one or more channels according to a wireless network specification, where the channels relate to contiguous or non-contiguous portions of OFDM symbols. Thus, upon the receiver component 102 obtaining the signal, it can perform channel estimation to determine data transmitted in the signal. In addition, the received signal can exhibit uncertain frequency response, for example, where the channels transmitted in the signal can run at different phases and amplitude. In this example, the discriminator component 104 can further multiply the shifted up and/or shifted down signals by a channel estimation to rid of the uncertain frequency response, as described in further detail below. This, again, produces a discriminator signal, which the discriminator component 104 can utilize to determine the frequency offset.

Figure 2:
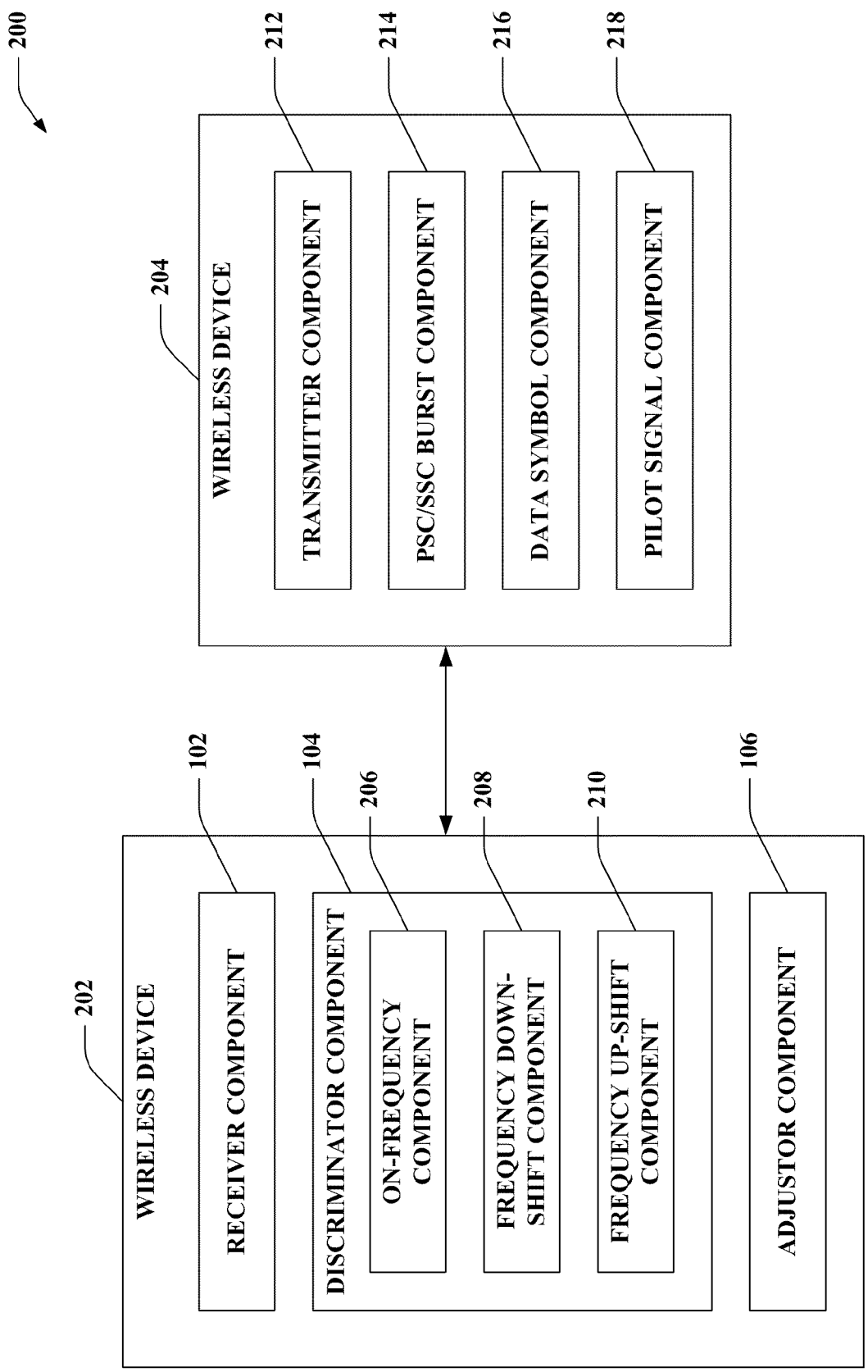
FIG. 2 illustrates an example wireless communication network that effectuates applying frequency error offset based on a computed discriminator signal.

Now referring to FIG. 2, illustrated is a wireless communications system 200 that facilitates frequency tracking and receiver adjustment. Wireless devices 202 and 204 can be mobile devices (including not only independently powered devices, but also modems, for example), base stations, and/or portions thereof. In one example, the wireless devices 202 and 204 can communicate using peer-to-peer or ad hoc technology where the devices 202 and 204 are of similar type. Moreover, system 200 can be a MIMO system and/or can conform to one or more wireless network system specifications (e.g., EV-DO, 3GPP, 3GPP2, 3GPP LTE, WiMAX, etc.). Also, the wireless device 202 can comprise components and functionalities shown and described below in the wireless device 204, and vice versa; in one example, the configuration depicted excludes these components for ease of explanation.

Wireless device 202 can comprise a receiver component 102 that obtains wireless signals in a wireless network, a discriminator component 104 that can determine a frequency error in signals received by the receiver component 102, and an adjustor component 106 that can modify the receiver component 102 in view of the determined frequency error. The discriminator component 104 can comprise an on-frequency component 206 that estimates one or more channels in a received signal, a frequency down-shift component 208 that shifts a received signal downward by a fraction of a frequency tone, and a frequency up-shift component 210 that shifts the received signal upward by a similar or different fraction of the frequency tone. In one example, the discriminator component 104 utilizes these components to generate a discriminator signal, which it can utilize to determine frequency error of the receiver component 102.

Wireless device 204 can comprise a transmitter component 212 that can transmit one or more signals in a wireless communications network. The wireless device 204 can further optionally comprise a PSS/SSS burst component 214 that generates one or more PSS/SSS bursts for transmission thereof, a data symbol component 216 that creates data symbols (e.g., shared communication channel data symbols, packet data control channel (PDCCH) data symbols, etc.) for communicating data in the network, and a pilot signal component 218 that formulates one or more pilot signals for identifying the wireless device 204 in the wireless network. The transmitter component 212 can transmit the PSS/SSS bursts, data symbols, and/or pilot signals, for instance.

According to an example, the transmitter component 212 can transmit one or more signals, as described, which can be obtained by the receiver component 102. In one example, the discriminator component 104 can determine a frequency error of the receiver component 102; this can be performed in a frequency tracking loop according to a timer, once every n signals, and/or the like. As described, in one example, the signal transmitted by the transmitter component 212 can be an OFDM system signal. In this regard, each OFDM symbol in the signal can comprise a number tones, which can be a measurement of frequency over time. Thus, the transmitted signal s(n), of N tones, can be expressed in time domain waveform as:

$$s(n) = \frac{1}{\sqrt{N}} \sum_{k=0}^{N-1} S[k] \cdot e^{j2\pi kn/N}$$

where n=0, 1, ..., N−1, k is the index of the OFDM tone, S is the signal as transmitted having N tones, and j is the imaginary number. In addition, supposing channel discrete frequency response is H[k] with k=0, 1, ..., N−1, then the received signal, r(n), after removing cyclic prefix (CP) can be represented as:

$$r(n) = \frac{1}{\sqrt{N}} \sum_{k=0}^{N-1} S[k] \cdot H[k] \cdot e^{j2\pi kn/N}$$

According to one example, the discriminator component 104 can evaluate a single tone of the signal to determine an offset to apply to the receiver component 102. In this example, the transmitted signal can be defined as:

$$s(n) = \frac{1}{\sqrt{N}} S[k] \cdot e^{j2\pi kn/N}$$

and the received signal can, thus, be defined as:

$$r(n) = \frac{1}{\sqrt{N}} S[k] \cdot H[k] \cdot e^{j2\pi(k+f_{err})n/N} \approx S \cdot H \cdot e^{j2\pi(k+f_{err})n/N},$$

where $f_{err}$ the residual frequency error in the received signal. Dropping H and S for err ease of explanation, the on-frequency component 206 can estimate the channel frequency response $\hat{H}$ on tone k as:

$$\hat{H} = \frac{S^*}{\sqrt{N}|S|^2} \sum_{n=0}^{N-1} r(n) e^{-j2\pi kn/N} = \frac{H}{N} \sum_{n=0}^{N-1} e^{j2\pi f_{err} n/N}$$

where S* is the complex conjugate of the transmitted signal. This is the k-th entry of the fast Fourier transform (FFT) output at the receiver component 102. In addition, the frequency down-shift component 208 can, concurrently or otherwise, shift the received signal downward by a portion of a tone. In one example, the frequency down-shift component 208 can shift the received signal downward by a half tone, which can be represented as:

$$r^+(n) = r(n) \cdot e^{j2\pi \cdot 0.5n/N} = \frac{1}{\sqrt{N}} S \cdot H \cdot e^{j2\pi(k+f_{err}+0.5)n/N}.$$

The frequency portion on the k-th tone of $r^+(n)$, $R^+$, is also computed (e.g. via FFT) as:

$$R^+ = \frac{S^*}{\sqrt{N}|S|^2} \sum_{n=0}^{N-1} r^+(n) e^{-j2\pi kn/N} = \frac{H}{N} \sum_{n=0}^{N-1} e^{j2\pi(f_{err}+0.5)n/N}.$$

Similarly, the frequency up-shift component 210 can shift the received signal up a portion of a tone (e.g., half of a tone in this case). Thus, $R^-$ is computed:

$$R^- = \frac{H}{N} \sum_{n=0}^{N-1} e^{j2\pi(f_{err}+0.5)n/N}.$$

As described previously, the received signal can have channels running at different phases, which can cause uncertain frequency response in the signal. To mitigate the uncertain frequency response, the discriminator component 104 can multiply the down-shifted signal by the conjugate of the on-frequency signal generated by the on-frequency component 206, $\hat{H}^*$, provided by:

$$R^+ \hat{H}^* = \left(\frac{H}{N} \sum_{n=0}^{N-1} e^{j2\pi(f_{err}+0.5)n/N}\right)\left(\frac{H}{N} \sum_{n=0}^{N-1} e^{j2\pi f_{err} n/N}\right)^*$$

-continued $$= \frac{|H|^2(1 - e^{j2\pi(f_{err}+0.5)})(1 - e^{-j2\pi f_{err}})}{N^2(1 - e^{j2\pi(f_{err}+0.5)n/N})(1 - e^{-j2\pi f_{err}/N})}$$

$$= j \cdot \frac{|H|^2 \sin(2\pi f_{err})}{2N^2 e^{j\pi/(2N)} \sin\left(\frac{\pi}{N}(f_{err} + 0.5)\right)\sin\left(\frac{\pi}{n} f_{err}\right)}$$

where the up-shift/down-shift in frequency is one half of a tone. In one example, if $f_{err} \ll N$, $|f_{err}| < 0.5$, and $N \ll 1$, the equation above can be simplified as:

$$R^+ \cdot H^* \approx j \cdot \frac{|H|^2 \sin(2\pi f_{err})}{2(\pi(f_{err}+0.5))(\pi f_{err})} = j \cdot \frac{|H|^2 \sin(2\pi |f_{err}|)}{2\pi^2 |f_{err}+0.5| \cdot |f_{err}|}.$$

where the up-shift/down-shift in frequency is one half of a tone. Similarly, the up-shifted signal multiplied by the on-frequency signal can be represented as:

$$R^- \cdot \hat{H}^* \approx j \cdot \frac{|H|^2 \sin(2\pi f_{err})}{2(\pi(f_{err}-0.5))(\pi f_{err})} = -j \cdot \frac{|H|^2 \sin(2\pi |f_{err}|)}{2\pi^2 |f_{err}-0.5| \cdot |f_{err}|}.$$

where the up-shift/down-shift in frequency is one half of an OFDM tone. As mentioned, the discriminator component 104 can sum the up-shifted and down-shifted signals, multiplying the signals by the on-frequency channel estimation, to generate a discriminator signal related to frequency error of the receiver component 102. Thus, the discriminator component 104 can utilize the following formula, in one example:

$$\text{Im}\{(R^+ + R^-) \cdot \hat{H}^*\} \approx \frac{|H|^2 \sin(2\pi |f_{err}|)}{2\pi^2 |f_{err}+0.5| \cdot |f_{err}|} - \frac{|H|^2 \sin(2\pi |f_{err}|)}{2\pi^2 |f_{err}-0.5| \cdot |f_{err}|} =$$

$$\frac{|H|^2 \sin(2\pi |f_{err}|)}{2\pi^2 |f_{err}|} \cdot \frac{|f_{err} - 0.5| - |f_{err} + 0.5|}{|f_{err} + 0.5| \cdot |f_{err} - 0.5|}$$

where the up-shift/down-shift in frequency is one half of an OFDM tone. Where the discriminator component 104 utilizes pilot tones to determine the frequency error, the following formula can be used, for instance:

$$\text{Im}\left\{\sum_{k=\Omega}(R^+[k] + R^-[k]) \cdot \hat{H}^*[k]\right\} \approx$$

$$\frac{\sum_{k=\Omega}|H[K]|^2 \sin(2\pi |f_{err}|)}{2\pi^2 |f_{err}|} \cdot \frac{|f_{err} - 0.5| - |f_{err} + 0.5|}{|f_{err} + 0.5| \cdot |f_{err} - 0.5|},$$

where $\Omega$ represents one or more pilot tones and the up-shift/down-shift in frequency is one half of a tone. In this example, the pilot signal component 218 can generate a pilot signal, which the transmitter component 212 can transmit.

As described, it is to be appreciated that pilot signals need not be used; rather, in one example, the PSS/SSS burst component 214 can generate a PSS/SSS burst for transmission by the transmitter component and/or the transmitter component 212 can transmit one or more data symbols from the data symbol component 216. Other signals are possible as well; the examples are provided for ease of explanation. Based on the computed discriminator signal, the discriminator component 104 can discern a frequency error offset, and the adjustor component 106 can apply the offset to the receiver component 102, as described infra. It is to be appreciated, in one example, that a searcher (not shown) can be utilized for coarse frequency estimation (e.g., when switching cells) while the discriminator component 104 can be used for refining the estimation in a frequency tracking loop.

Figure 3:
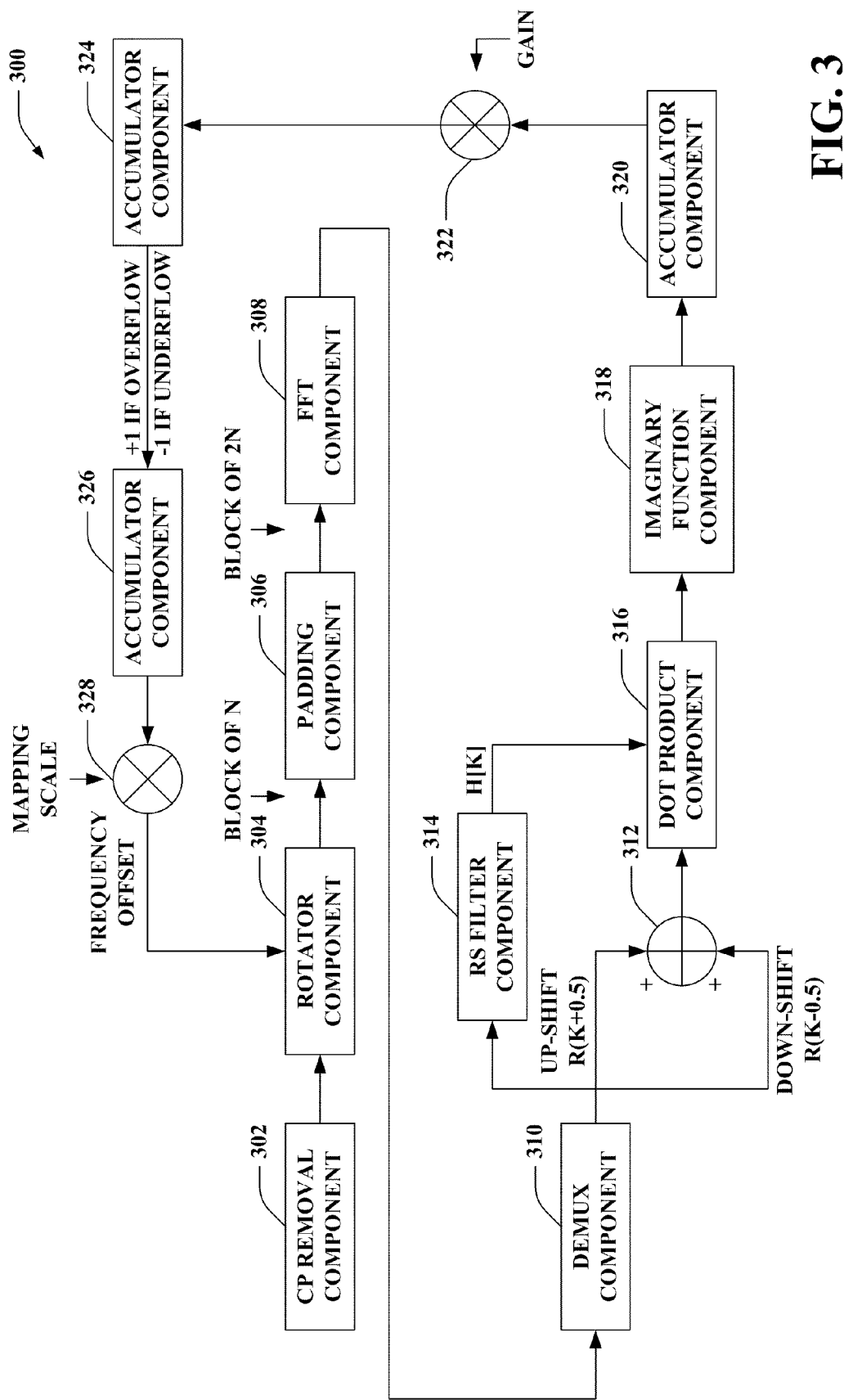
FIGS. 3-5 illustrate examples of frequency tracking loop implementations in accordance with aspects described herein.

Turning to FIG. 3, illustrated is an example frequency tracking loop implementation 300. A CP removal component 302 is shown that can receive one or more signals or samples thereof for determining a frequency error offset related to a receiver and strip the CP from a signal. A rotator component 304 can apply an offset to the received signal, which is computed by the remaining components. For example, a padding component 306 is provided that pads a signal of N samples with an additional N zero-valued samples, where the samples correspond to a set of signal values at given points in time. An FFT component 308 performs an FFT on the padded signal with 2N samples to get the frequency-domain representation of the signal; since the N samples are padded with N zero-valued samples before passing through an FFT, the FFT component 308 produces not only the frequency representation of the signal at regular tones, but also the frequency representation of the signal at half tones in between regular tones. A demux component 310 can separate the original signal along with the signal shifted a half tone upward and the signal shifted a half tone downward since the FFT component 308 produced the half tone steps along with the original tones.

The upward and downward shifted signals can be summed 312 to produce a combined signal. A reference signal (RS) filter component 314 can estimate the channel frequency response (e.g., H[k] in the above formulas) using a reference signal (such as a pilot signal), and a dot product component 316 can determine the dot product of the channel estimate and the combined signal, as described. An imaginary function component 318 can apply to extract the imaginary portion of the dot product output, as shown in the formulas above. This yields the discriminator signal, as described. A plurality of accumulator components 320, 324, and 326 are also shown that facilitate storing intermediate values in computations. For example, the accumulator component 320 can store the result of the imaginary function from the imaginary function component 318, which is the computed discriminator signal.

The RS symbols produced by the RS filter component 314 can be updated in view of the discriminator signal, and the RS symbols can be multiplied by a gain signal 322. The accumulator component 324 can store the resulting signal. If the values of the resulting signal overflow set value ranges, a positive adjustment indicator can be sent to the accumulator component 326, and if values of the resulting signal underflow the value range, a negative adjustment indicator can be sent to the accumulator component 326. A mapping scale 328 can be applied to the adjustment indicator to produce the frequency error offset. The rotator component 304 can apply the offset to received signals to accordingly account for the frequency error, as described. Though RS is shown as the evaluated signal in this example, it is to be appreciated, as described, that other types of signals can additionally or alternatively be evaluated to determine frequency error, such as PSS/SSS bursts, data symbols, etc. In addition, it is to be appreciated that the rotator component 304 can gradually apply the frequency offset in a frequency tracking loop.

Figure 4:
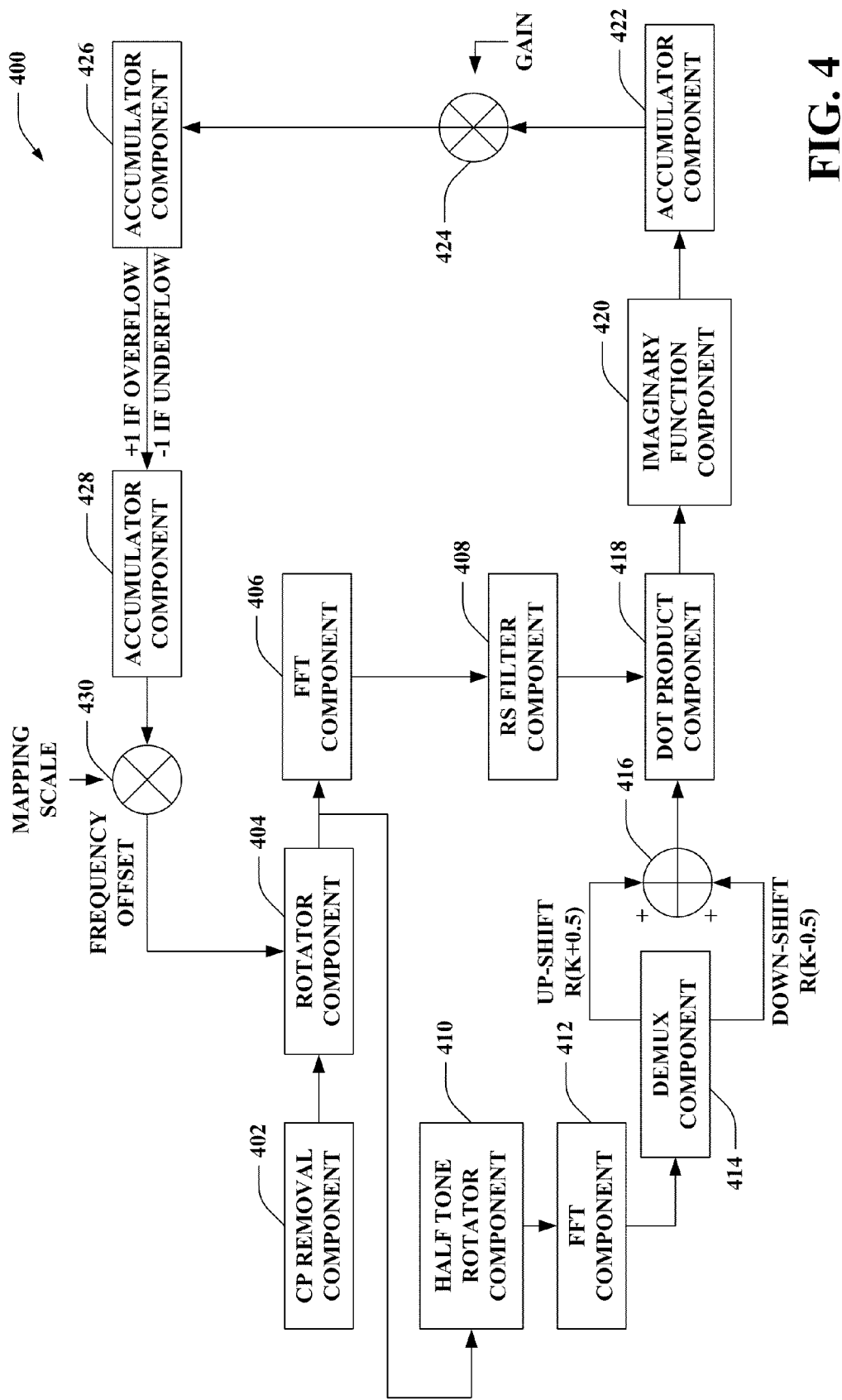

Referring to FIG. 4, illustrated is an example frequency tracking loop implementation 400. A CP removal component 402 is shown that can receive one or more signals or samples thereof for determining a frequency error offset related to a receiver and extract the CP from a signal. A rotator component 404 can apply a frequency error offset to the received signal, which is computed by the remaining components, as described. For example, an FFT component 406 performs an FFT on the received and rotated signal to produce a channel estimation of the signal. A RS filter component 408 can estimate the channel frequency response (e.g., H[k]). Moreover, the signal from the rotator component 404 can be additionally rotated by a half tone rotator component 410 to produce a signal offset by half of a tone. Similarly, the FFT component 412 performs an FFT to produce a channel estimation of the half tone rotated signal. A demux component 414 can produce a half tone up-shifted representation of the original signal as well as a half tone down-shifted representation from the half tone rotated signal.

The up-shifted and down-shifted signals can be summed 416 to produce a combined signal. A dot product component 418 can determine the dot product of the channel estimate from the RS filter component 408 and the combined signal, as described. An imaginary function component 420 can apply the imaginary function (Im) to extract the imaginary portion of the dot product, as shown in the formulas above. This yields a discriminator signal related to frequency offset of the receiver, as described. A plurality of accumulator components 422, 426, and 428 are also shown that facilitate storing intermediate values in computations. For example, the accumulator component 422 can store the result of the imaginary function from the imaginary function component 420, which is the determined discriminator signal.

The output of the accumulator component 422 can be multiplied by a gain signal 424. The accumulator component 426 can store the resulting signal. If the values of the resulting signal overflow predetermined value ranges, a positive adjustment indicator can be sent to the accumulator component 428, and if values of the resulting signal underflow the value range, a negative adjustment indicator can be sent to the accumulator component 428. A mapping scale 430 can be applied to the adjustment indicator to produce a frequency offset. The rotator component 404 can apply the offset to received signals accounting for the frequency error, as described. Though RS is shown as the evaluated signal in this example, it is to be appreciated, as described, that other types of signals can additionally or alternatively be evaluated to determine frequency error, such as PSC/SSC bursts, data symbols, etc.

Figure 5:
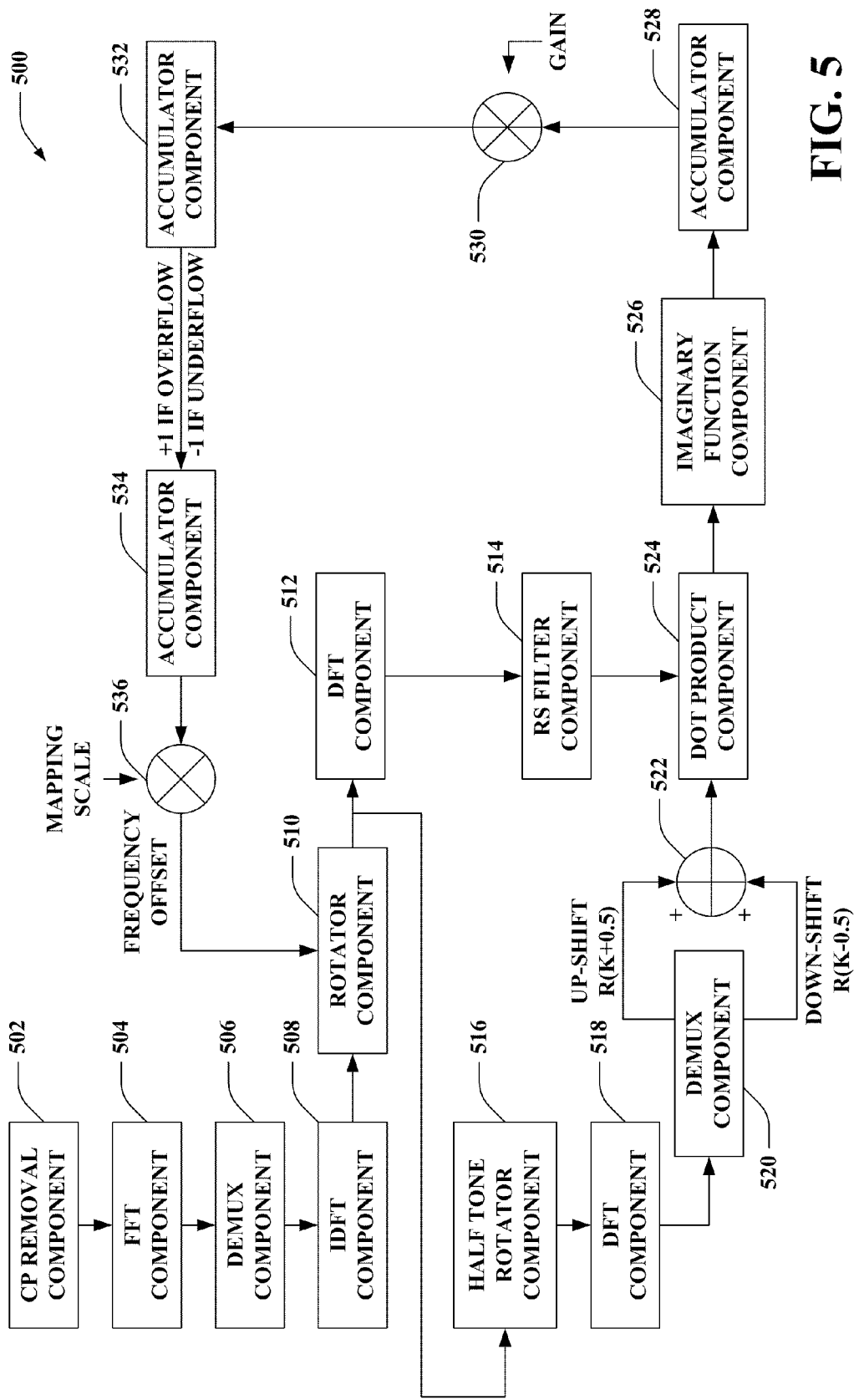

Turning now to FIG. 5, illustrated is an example frequency tracking loop implementation 500 for signals multiplexed by multiple devices (e.g., uplink signals in 3GPP LTE). A CP removal component 502 is shown that can receive one or more multiplexed signals or samples thereof for determining a frequency error offset related to a receiver and extract the CP from a multiplexed signal. An FFT component 504 can produce an estimation for the multiplexed signal, and a demux component 506 can extract individual signals related to one or more devices. An inverse discrete Fourier transform (IDFT) component 508 can perform an IDFT on the signal to allow a rotation over the signal. A rotator component 510 can apply a frequency error offset to the signal, which is computed by the remaining components, as described. For example, a DFT component 512 performs a DFT on the received and rotated signal to produce a channel estimation of the signal. A RS filter 514 can estimate the channel frequency response (e.g., H[k]) from the estimation. Moreover, the signal from the rotator component 504 can be additionally rotated by a half tone rotator component 516 to produce a signal offset by half of a tone. Similarly, the DFT component 518 performs a DFT to produce a channel estimation of the half tone rotated signal. A demux component 520 can produce a half tone up-shifted representation of the original signal as well as a half tone down-shifted representation from the half tone rotated signal.

The up-shifted and down-shifted signals can be summed 522 to produce a combined signal. A dot product component 524 can determine the dot product of the pilot channel from the RS filter component 514 and the combined signal, as described, to remove uncertain frequency response. An imaginary function component 526 can apply the imaginary function (Im) to extract the imaginary portion of the dot product, as shown in the formulas above. This yields a discriminator signal related to the frequency error offset of the receiver, as described. A plurality of accumulator components 528, 532, and 534 are also shown that facilitate storing intermediate values in computations. For example, the accumulator component 528 can store the result of from the imaginary function component 526, which is the discriminator signal.

The output of the accumulator 528 can be multiplied by a gain signal 530. The accumulator component 532 can store the resulting signal. If the values of the resulting signal overflow predetermined value ranges, a positive adjustment indicator can be sent to the accumulator component 534, and if values of the resulting signal underflow the value range, a negative adjustment indicator can be sent to the accumulator component 534. A mapping scale 536 can be applied to the adjustment indicator to produce a frequency offset. The rotator component 510 can apply the offset to received signals accounting for the frequency error, as described. Though RS is shown as the evaluated signal in this example, it is to be appreciated, as described, that other types of signals can additionally or alternatively be evaluated to determine frequency error, such as PSS/SSS bursts, data symbols, etc.

Figure 6:
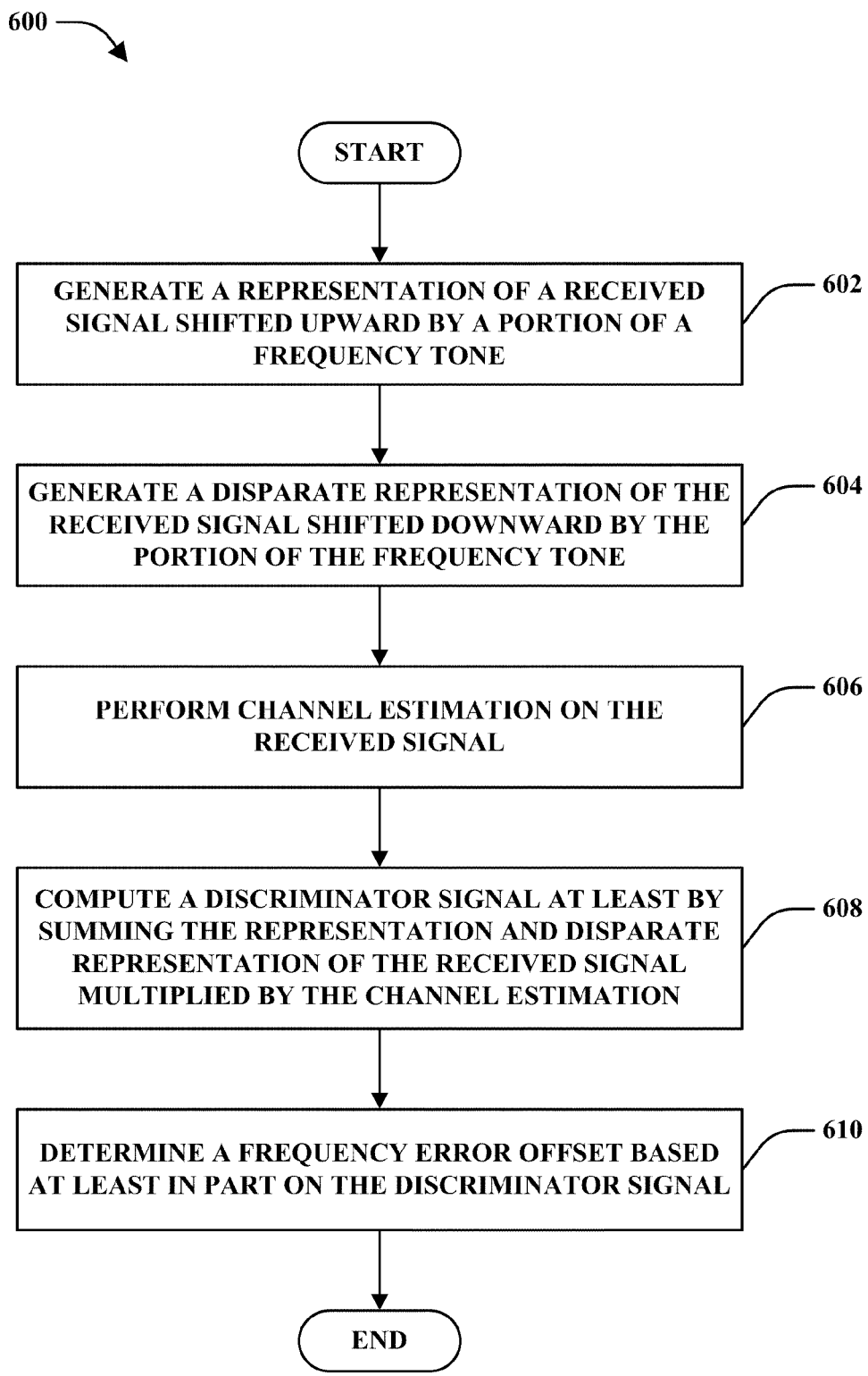
FIG. 6 is a flow diagram of an example methodology that facilitates determining a frequency error offset from a computed discriminator signal.
Figure 7:
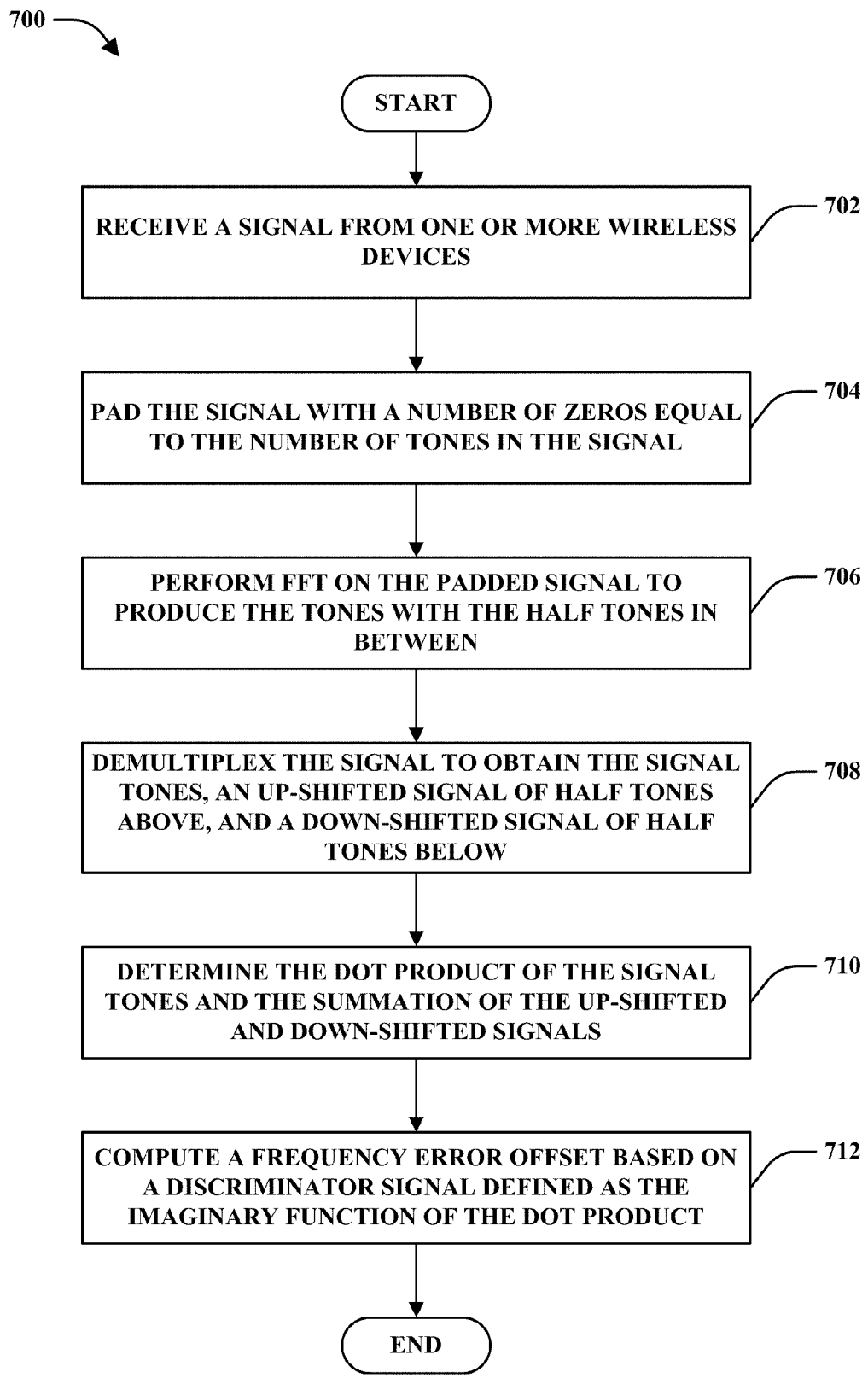
FIGS. 7-8 are flow diagrams of example methodologies that compute a frequency error offset from a discriminator signal.
Figure 8:
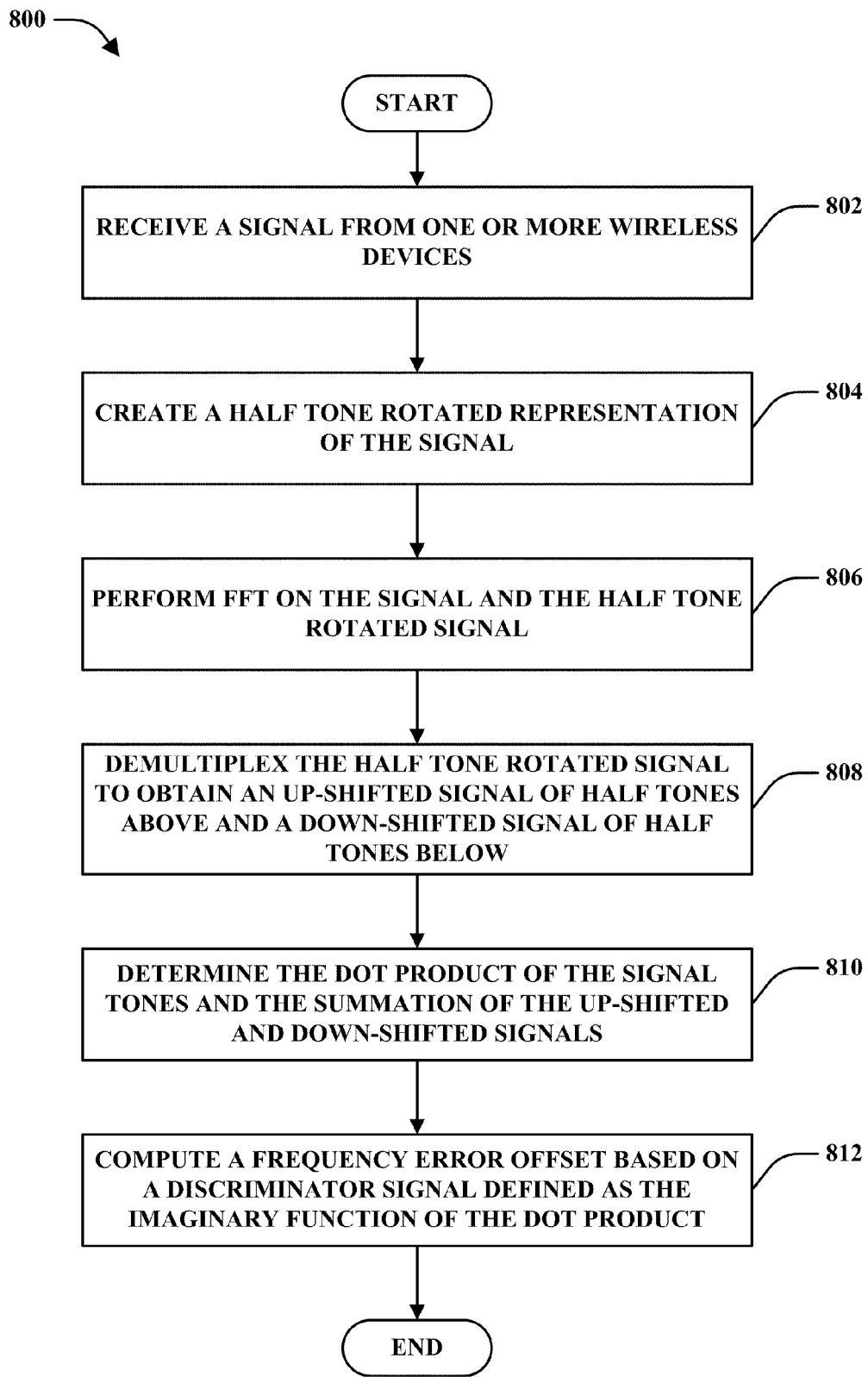

Referring now to FIGS. 6-8, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 6, illustrated is an example methodology 600 for discerning a frequency error in a received signal. At 602, a representation of a received signal shifted upward by a portion of a frequency tone can be generated. As mentioned, the portion of the frequency tone can be half of a tone, a quarter of a tone, a third of a tone, etc. At 604, a disparate representation of the received signal shifted downward by the portion of the frequency tone can be generated. At 606, channel estimation can be performed over the received signal. A discriminator signal can be computed, at 608, at least by summing the representation and the disparate representation of the received signal multiplied by the channel estimation. Multiplying by the channel estimation, for example, can remove uncertain frequency responses caused by disparate phasing of the signals. At 610, a frequency error offset can be determined based at least in part on the discriminator signal. In addition, a receiver can be adjusted based on the offset, as described herein.

Turning to FIG. 7, an example methodology 700 is illustrated that facilitates determining a frequency error offset in wireless communications. At 702, a signal can be received from one or more wireless devices. The signal can be padded with a number of zeros samples equal to the number of samples in the signal at 704, effectively doubling the signal size. At 706, an FFT can be performed on the padded signal to produce the tones with the half tones in between; the half tones are produced due to the doubled signal size, for example. At 708, the signal can be demultiplexed to produce the original signal from the signal tones, an up-shifted signal of half tones above the original tones, and a down-shifted signal of half tones below the original tones. At 710, a dot product of the original signal tones and a summation of the up-shifted and down-shifted signals can be determined. A frequency error offset can be computed based on a discriminator signal defined by the imaginary function applied to the dot product, at 712, as described.

FIG. 8 illustrates an example methodology 800 for determining a frequency error offset in wireless communications. At 802, a signal can be received from one or more wireless devices. At 804, a half tone rotated representation of the signal can be created, as described. An FFT can be performed on the signal and the half tone rotated signal, at 806, to produce channel estimations. At 808, the half tone rotated signal can be demultiplexed to produce an up-shifted signal of half tones above the original signal tones, and a down-shifted signal of half tones below the original signal tones. At 810, a dot product of the original signal tones, obtained from the FFT of the signal, and a summation of the up-shifted and down-shifted signals can be determined. A frequency error offset can be computed based on a discriminator signal defined by the imaginary function applied to the dot product, at 812, as described.

It will be appreciated that, in accordance with one or more aspects described herein, inferences can be made regarding determining a discriminator signal, applying a frequency offset based on the discriminator signal, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
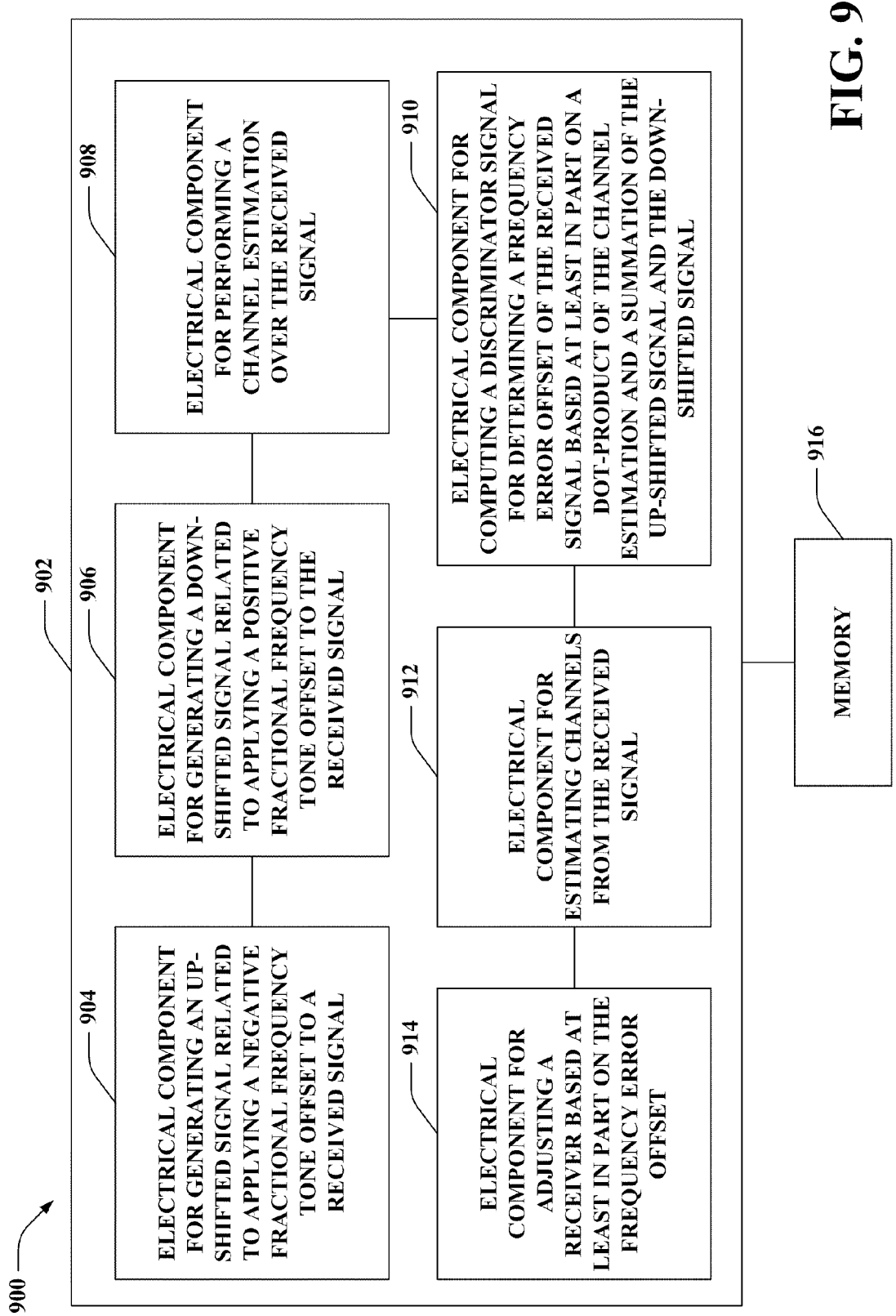
FIG. 9 is a block diagram of an example apparatus that facilitates determining a frequency error offset based on computing a discriminator signal.

With reference to FIG. 9, illustrated is a system 900 that determines a frequency error offset related to a received signal. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for generating an up-shifted signal related to applying a negative fractional frequency tone offset to a received signal 904. As described, the up-shifted signal can be created in part by padding the original signal with zeroed samples to allow an FFT to create a half tone spaced signal and/or by producing a replica of the original signal rotated by a half tone. Further, logical grouping 902 can comprise an electrical component for generating a down-shifted signal related to applying a positive fractional frequency tone offset to the received signal 906. In addition, logical grouping 908 can comprise an electrical component for performing a channel estimation over the received signal 908.

Furthermore, logical grouping 902 can include an electrical component for computing a discriminator signal for determining a frequency error offset of the received signal based at least in part on a dot-product of the channel estimation and a summation of the up-shifted signal and the down-shifted signal 910. Logical grouping 902 can further comprise an electrical component for estimating channels from the received signals 912. As described, the electrical component 908 can further compute the discriminator signal based at least in part on computing a dot product of the summed signals and estimated channels, for example. As described, this can remove uncertainty in frequency responses due to fading. The electrical component 908, for instance, can further calculate a frequency error offset based on the discriminator signal, as described. In addition, logical grouping 902 can include an electrical component for adjusting a receiver based at least in part on the frequency error offset 914. Additionally, system 900 can include a memory 916 that retains instructions for executing functions associated with electrical components 904, 906, 908, 910, 912, and 914. While shown as being external to memory 916, it is to be understood that one or more of electrical components 904, 906, 908, 910, 912, and 914 can exist within memory 916.

Figure 10:
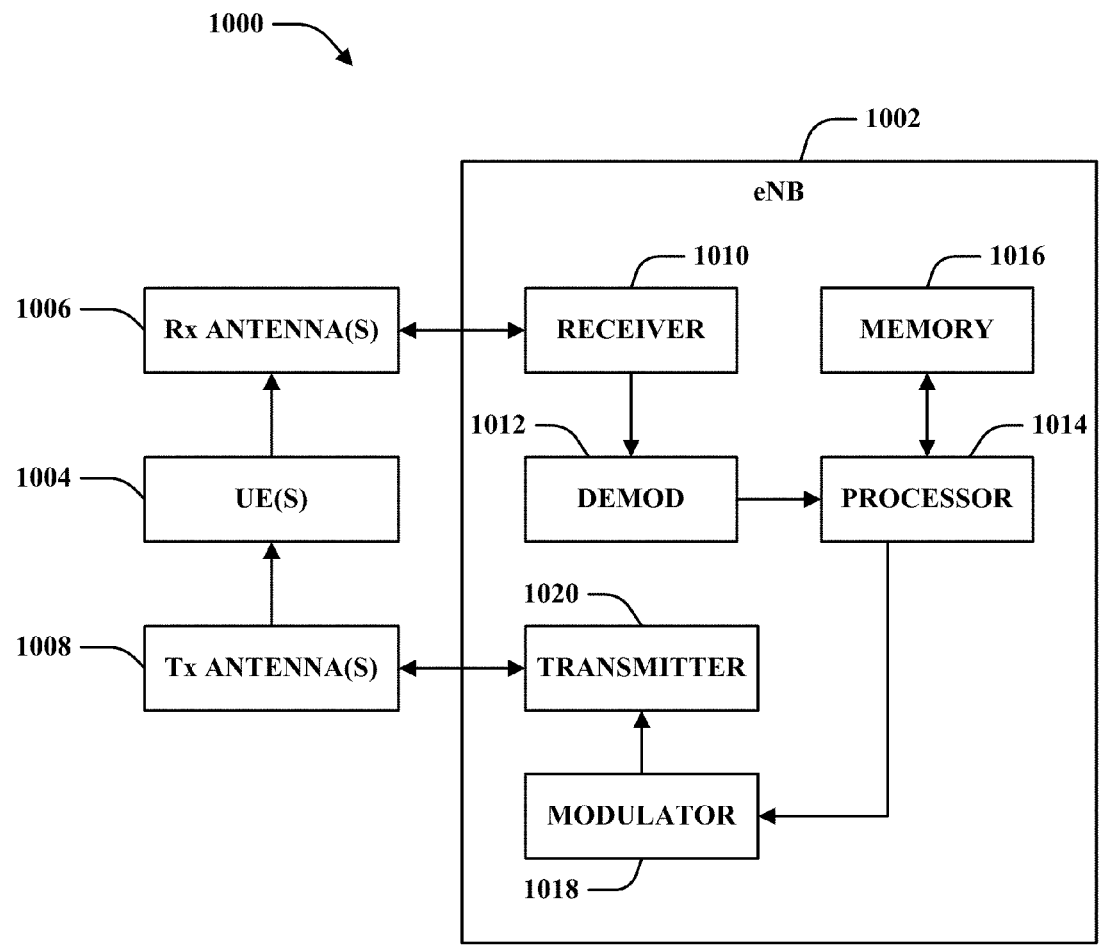
FIGS. 10-11 are block diagrams of example wireless communication devices that can be utilized to implement various aspects of the functionality described herein.

FIG. 10 is a block diagram of a system 1000 that can be utilized to implement various aspects of the functionality described herein. In one example, system 1000 includes a base station or eNB 1002. As illustrated, eNB 1002 can receive signal(s) from one or more UEs 1004 via one or more receive (Rx) antennas 1006 and transmit to the one or more UEs 1004 via one or more transmit (Tx) antennas 1008. Additionally, eNB 1002 can comprise a receiver 1010 that receives information from receive antenna(s) 1006. In one example, the receiver 1010 can be operatively associated with a demodulator (Demod) 1012 that demodulates received information. Demodulated symbols can then be analyzed by a processor 1014. Processor 1014 can be coupled to memory 1016, which can store information related to code clusters, access terminal assignments, lookup tables related thereto, unique scrambling sequences, and/or other suitable types of information. In one example, eNB 1002 can employ processor 1014 and/or receiver 1010 to perform methodologies 600, 700, 800, and/or other similar and appropriate methodologies. eNB 1002 can also include a modulator 1018 that can multiplex a signal for transmission by a transmitter 1020 through transmit antenna(s) 1008.

Figure 11:
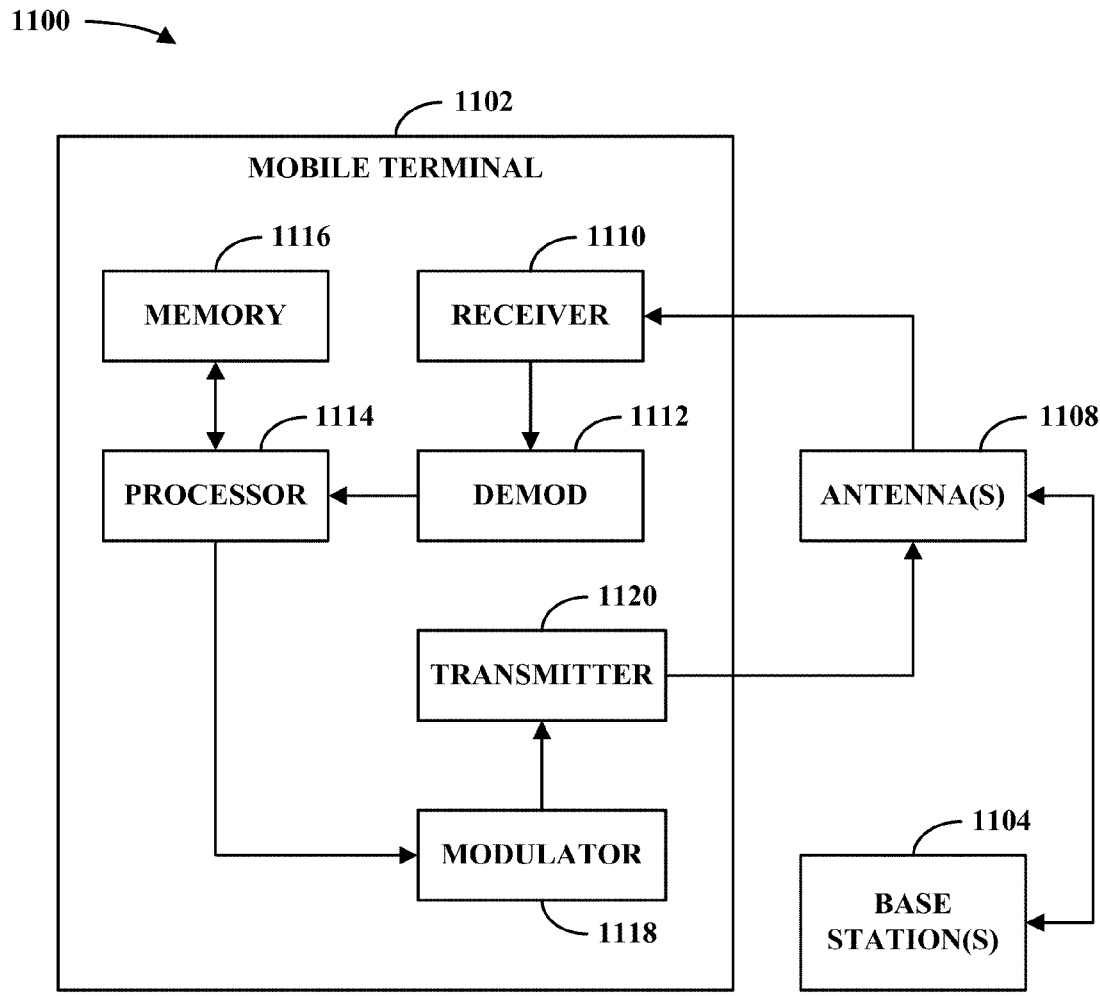

FIG. 11 is a block diagram of another system 1100 that can be utilized to implement various aspects of the functionality described herein. In one example, system 1100 includes a mobile terminal 1102. As illustrated, mobile terminal 1102 can receive signal(s) from one or more base stations 1104 and transmit to the one or more base stations 1104 via one or more antennas 1108. Additionally, mobile terminal 1102 can comprise a receiver 1110 that receives information from antenna(s) 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to mobile terminal 1102. Additionally, mobile terminal 1102 can employ processor 1114 and/or receiver 1110 to perform methodologies 600, 700, 800, and/or other similar and appropriate methodologies. Mobile terminal 1102 can also employ one or more components described in previous figures to effectuate the described functionality; in one example, the components can be implemented by the processor 1114. Mobile terminal 1102 can also include a modulator 1118 that can multiplex a signal for transmission by a transmitter 1120 through antenna(s) 1108.

Figure 12:
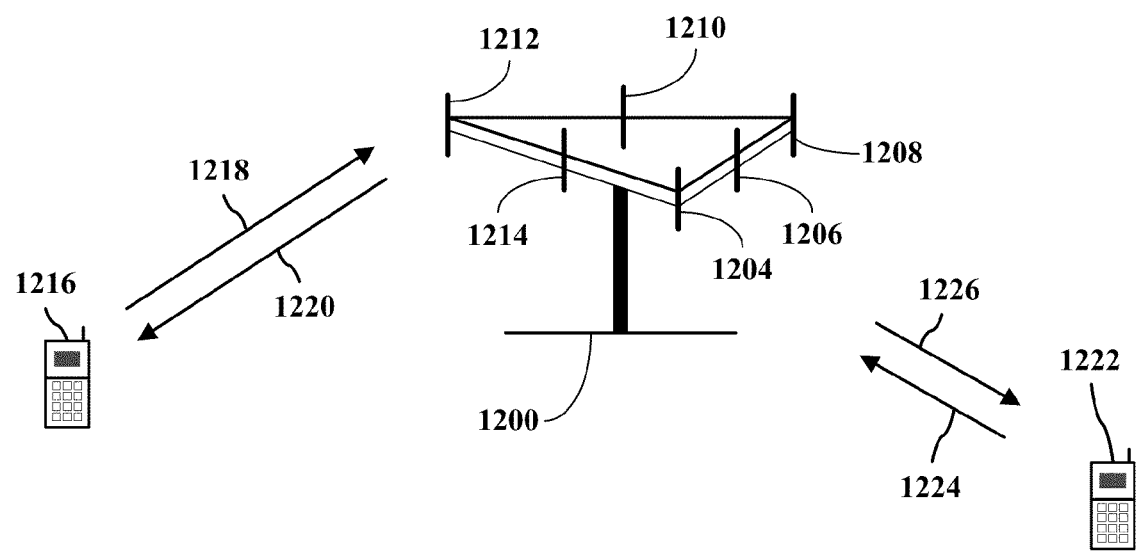
FIG. 12 illustrates an example wireless multiple-access communication system in accordance with various aspects set forth herein.

Referring now to FIG. 12, an illustration of a wireless multiple-access communication system is provided in accordance with various aspects. In one example, an access point 1200 (AP) includes multiple antenna groups. As illustrated in FIG. 12, one antenna group can include antennas 1204 and 1206, another can include antennas 1208 and 1210, and another can include antennas 1212 and 1214. While only two antennas are shown in FIG. 12 for each antenna group, it should be appreciated that more or fewer antennas may be utilized for each antenna group. In another example, an access terminal 1216 can be in communication with antennas 1212 and 1214, where antennas 1212 and 1214 transmit information to access terminal 1216 over forward link 1220 and receive information from access terminal 1216 over reverse link 1218. Additionally and/or alternatively, access terminal 1222 can be in communication with antennas 1206 and 1208, where antennas 1206 and 1208 transmit information to access terminal 1222 over forward link 1226 and receive information from access terminal 1222 over reverse link 1224. In a frequency division duplex system, communication links 1218, 1220, 1224 and 1226 can use different frequency for communication. For example, forward link 1220 may use a different frequency then that used by reverse link 1218.

Each group of antennas and/or the area in which they are designed to communicate can be referred to as a sector of the access point. In accordance with one aspect, antenna groups can be designed to communicate to access terminals in a sector of areas covered by access point 1200. In communication over forward links 1220 and 1226, the transmitting antennas of access point 1200 can utilize beamforming in order to improve the signal-to-noise ratio of forward links for the different access terminals 1216 and 1222. Also, an access point using beamforming to transmit to access terminals scattered randomly through its coverage causes less interference to access terminals in neighboring cells than an access point transmitting through a single antenna to all its access terminals.

An access point, e.g., access point 1200, can be a fixed station used for communicating with terminals and can also be referred to as a base station, an eNB, an access network, and/or other suitable terminology. In addition, an access terminal, e.g., an access terminal 1216 or 1222, can also be referred to as a mobile terminal, user equipment, a wireless communication device, a terminal, a wireless terminal, and/or other appropriate terminology.

Figure 13:
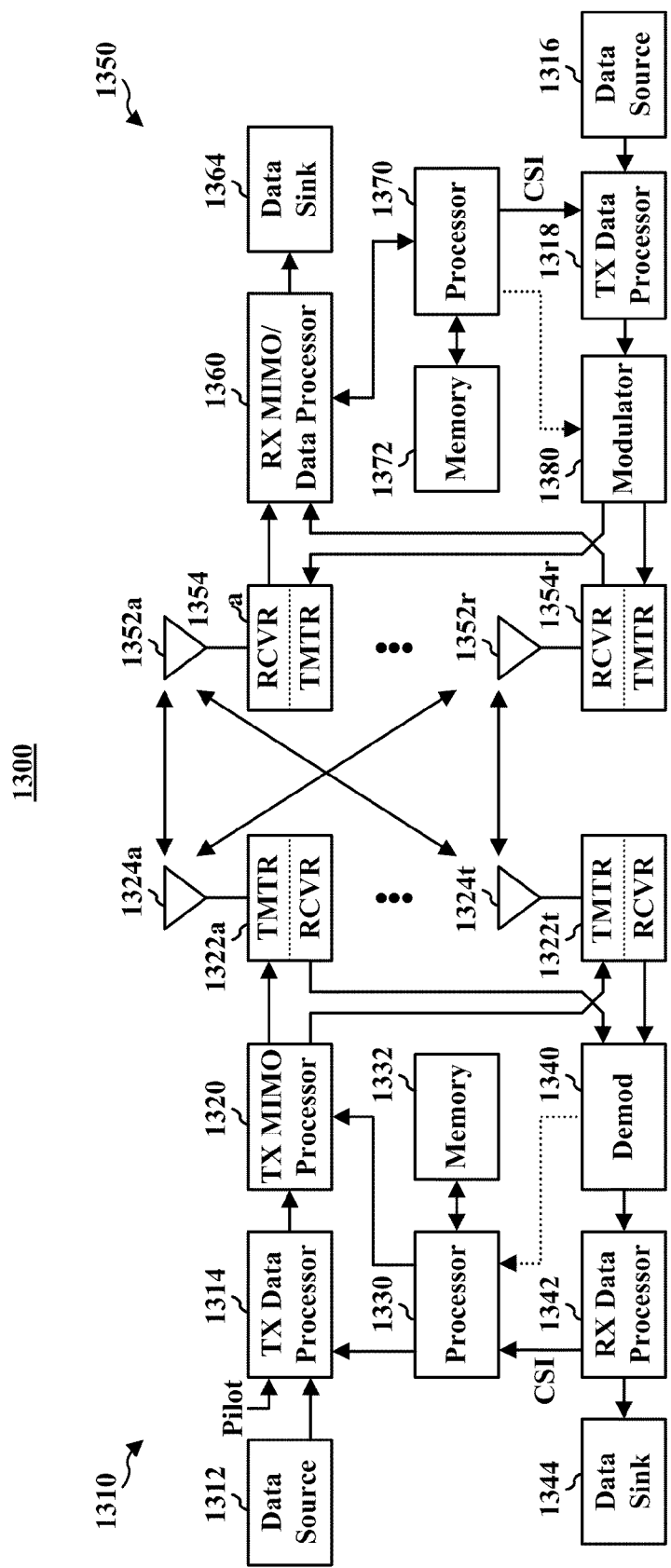
FIG. 13 is a block diagram illustrating an example wireless communication system in which various aspects described herein can function.

Referring now to FIG. 13, a block diagram illustrating an example wireless communication system 1300 in which various aspects described herein can function is provided. In one example, system 1300 is a multiple-input multiple-output (MIMO) system that includes a transmitter system 1310 and a receiver system 1350. It should be appreciated, however, that transmitter system 1310 and/or receiver system 1350 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1310 and/or receiver system 1350 described herein could be utilized in connection with a single output to single input antenna system.

In accordance with one aspect, traffic data for a number of data streams are provided at transmitter system 1310 from a data source 1312 to a transmit (TX) data processor 1314. In one example, each data stream can then be transmitted via a respective transmit antenna 1324. Additionally, TX data processor 1314 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1350 to estimate channel response. Back at transmitter system 1310, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1330.

Next, modulation symbols for all data streams can be provided to a TX processor 1320, which can further process the modulation symbols (e.g., for OFDM). TX MIMO processor 1320 can then provides $N_T$ modulation symbol streams to $N_T$ transceivers 1322a through 1322t. In one example, each transceiver 1322 can receive and process a respective symbol stream to provide one or more analog signals. Each transceiver 1322 can then further condition (e.g., amplify, filter, and upconvert) the analog signals to provide a modulated signal suitable for transmission over a MIMO channel. Accordingly, $N_T$ modulated signals from transceivers 1322a through 1322t can then be transmitted from $N_T$ antennas 1324a through 1324t, respectively.

In accordance with another aspect, the transmitted modulated signals can be received at receiver system 1350 by $N_R$ antennas 1352a through 1352r. The received signal from each antenna 1352 can then be provided to respective transceivers 1354. In one example, each transceiver 1354 can condition (e.g., filter, amplify, and downconvert) a respective received signal, digitize the conditioned signal to provide samples, and then processes the samples to provide a corresponding "received" symbol stream. An RX MIMO/data processor 1360 can then receive and process the $N_R$ received symbol streams from $N_R$ transceivers 1354 based on a particular receiver processing technique to provide $N_T$ "detected" symbol streams. In one example, each detected symbol stream can include symbols that are estimates of the modulation symbols transmitted for the corresponding data stream. RX processor 1360 can then process each symbol stream at least in part by demodulating, deinterleaving, and decoding each detected symbol stream to recover traffic data for a corresponding data stream. Thus, the processing by RX processor 1360 can be complementary to that performed by TX MIMO processor 1320 and TX data processor 1316 at transmitter system 1310. RX processor 1360 can additionally provide processed symbol streams to a data sink 1364.

In accordance with one aspect, the channel response estimate generated by RX processor 1360 can be used to perform space/time processing at the receiver, adjust power levels, change modulation rates or schemes, and/or other appropriate actions. Additionally, RX processor 1360 can further estimate channel characteristics such as, for example, signal-to-noise-and-interference ratios (SNRs) of the detected symbol streams. RX processor 1360 can then provide estimated channel characteristics to a processor 1370. In one example, RX processor 1360 and/or processor 1370 can further derive an estimate of the "operating" SNR for the system. Processor 1370 can then provide channel state information (CSI), which can comprise information regarding the communication link and/or the received data stream. This information can include, for example, the operating SNR. The CSI can then be processed by a TX data processor 1318, modulated by a modulator 1380, conditioned by transceivers 1354a through 1354r, and transmitted back to transmitter system 1310. In addition, a data source 1316 at receiver system 1350 can provide additional data to be processed by TX data processor 1318.

Back at transmitter system 1310, the modulated signals from receiver system 1350 can then be received by antennas 1324, conditioned by transceivers 1322, demodulated by a demodulator 1340, and processed by a RX data processor 1342 to recover the CSI reported by receiver system 1350. In one example, the reported CSI can then be provided to processor 1330 and used to determine data rates as well as coding and modulation schemes to be used for one or more data streams. The determined coding and modulation schemes can then be provided to transceivers 1322 for quantization and/or use in later transmissions to receiver system 1350. Additionally and/or alternatively, the reported CSI can be used by processor 1330 to generate various controls for TX data processor 1314 and TX MIMO processor 1320. In another example, CSI and/or other information processed by RX data processor 1342 can be provided to a data sink 1344.

In one example, processor 1330 at transmitter system 1310 and processor 1370 at receiver system 1350 direct operation at their respective systems. Additionally, memory 1332 at transmitter system 1310 and memory 1372 at receiver system 1350 can provide storage for program codes and data used by processors 1330 and 1370, respectively. Further, at receiver system 1350, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for receiver frequency tracking in wireless communications, comprising:
   generating a representation of a received signal shifted upward by a portion of a frequency tone;
   generating a disparate representation of the received signal shifted downward by the portion of the frequency tone;
   performing a channel estimation over the received signal; and
   computing a discriminator signal for determining a frequency error offset in the received signal based at least in part on a dot product of a summation of the representation and disparate representation of the received signal.

2. The method of claim 1, wherein the discriminator signal is further computed as an imaginary portion of the dot product.

3. The method of claim 1, further comprising determining a frequency error offset based at least in part on the discriminator signal and adjusting a receiver of the signal based on the frequency error offset.

4. The method of claim 3, further comprising executing a frequency tracking loop where the frequency error offset is repeatedly determined and the receiver repeatedly adjusted according to a timer or event occurrence.

5. The method of claim 1, wherein the portion of the frequency tone is one half of a frequency tone.

6. The method of claim 1, wherein the received signal relates to a reference signal, one or more data symbols, a primary synchronization signal (PSS) burst, or a secondary synchronization signal (SSS) burst.

7. A wireless communications apparatus, comprising:
   at least one processor configured to:
      create an up-shifted signal by shifting a received signal in frequency domain upward by a fraction of frequency tone offset;
      create a down-shifted signal by shifting the received signal in frequency domain downward by the fraction of frequency tone offset;
      determine a channel estimate from the received signal; and
      computing a dot-product of the channel estimate and a summation of the up-shifted signal and the down-shifted signal to generate a discriminator signal for determining a frequency error offset of the received signal; and
   a memory coupled to the at least one processor.

8. The wireless communications apparatus of claim 7, wherein the at least one processor further determines the frequency error offset based at least in part on applying imaginary function to the dot product.

9. The wireless communications apparatus of claim 7, wherein the at least one processor is further configured to adjust a receiver according to the frequency error offset.

10. The wireless communications apparatus of claim 7, wherein the fraction of frequency tone offset is one half of a frequency tone.

11. The wireless communications apparatus of claim 7, wherein the received signal relates to a reference signal, one or more data symbols, a primary synchronization signal (PSS) burst, or a secondary synchronization signal (SSS) burst.

12. An apparatus that facilitates establishing selected radio bearers in wireless communications, comprising:
   means for generating an up-shifted signal related to applying a negative fractional frequency tone offset to a received signal;
   means for generating a down-shifted signal related to applying a positive fractional frequency tone offset to the received signal;
   means for performing a channel estimation over the received signal; and
   means for computing a discriminator signal for determining a frequency error offset of the received signal based at least in part on a dot-product of the channel estimation and a summation of the up-shifted signal and the down-shifted signal.

13. The apparatus of claim 12, wherein the means for determining the discriminator signal further applies imaginary function to the dot product to determine the discriminator signal.

14. The apparatus of claim 12, wherein the means for determining the discriminator signal further calculates the frequency error offset based at least in part on the discriminator signal.

15. The apparatus of claim 14, further comprising means for adjusting a receiver based at least in part on the frequency error offset.

16. The apparatus of claim 12, wherein the positive and negative fractional frequency tone offsets are one half of a frequency tone.

17. The apparatus of claim 12, wherein the received signal relates to a reference signal, one or more data symbols, a primary synchronization signal (PSS) burst, or a secondary synchronization signal (SSS) burst.

18. A non-transitory computer-readable medium embodied with a computer program product, comprising computer executable instructions, comprising:
   code for causing at least one computer to generate a representation of a received signal shifted upward by a portion of a frequency tone; code for causing the at least one computer to generate a disparate representation of the received signal shifted downward by the portion of the frequency tone;
   code for causing the at least one computer to generate a channel estimation from the received signal; and
   code for causing the at least one computer to compute a discriminator signal for determining a frequency error offset in the received signal based at least in part on a dot product of the channel estimation and a summation of the representation and disparate representation of the received signal.

19. The non-transitory computer-readable medium of claim 18, wherein the discriminator signal is further computed as an imaginary function applied to the dot product.

20. The non-transitory computer-readable medium of claim 18, further comprises code for causing the at least one computer to determine a frequency error offset based at least in part on the discriminator signal and adjust a receiver of the signal based on the frequency error offset.

21. The non-transitory computer-readable medium of claim 20, further comprises code for causing the at least one computer to execute a frequency tracking loop where the frequency error offset is repeatedly determined and the receiver repeatedly adjusted according to a timer or event occurrence.

22. The non-transitory computer-readable medium of claim 18, wherein the portion of the frequency tone is one half of a frequency tone.

23. The non-transitory computer-readable medium of claim 18, wherein the received signal relates to a reference signal, one or more data symbols, a primary synchronization signal (PSS) burst, or a secondary synchronization signal (SSS) burst.

24. An apparatus, comprising:
   a frequency up-shift component that generates an up-shifted signal related to applying a negative fractional frequency tone offset to a received signal;
   a frequency down-shift component that creates a down-shifted signal related to applying a positive fractional frequency tone offset to the received signal;
   an on-frequency component that generates a channel estimation from the received signal; and
   a discriminator component that formulates a discriminator signal for determining a frequency error offset of the received signal based at least in part on a dot product of the channel estimation and a summation of the up-shifted signal and the down-shifted signal.

25. The apparatus of claim 24, wherein the discriminator component further applies imaginary function to the dot product to determine the discriminator signal.

26. The apparatus of claim 24, wherein the discriminator component further calculates the frequency error offset based at least in part on the discriminator signal.

27. The apparatus of claim 26, further comprising an adjustor component that applies the frequency error offset to a receiver.

28. The apparatus of claim 24, wherein the positive and negative fractional frequency tone offsets are one half of a frequency tone.

29. The apparatus of claim 24, wherein the received signal relates to a reference signal, one or more data symbols, a primary synchronization signal (PSS) burst, or a secondary synchronization signal (SSS) burst.

* * * * *